Oct. 20, 1970  A. B. KELLER  3,534,631

INFINITELY VARIABLE RATIO CONSTANT MESH GEARING SYSTEM

Filed Aug. 16, 1968

INVENTOR
ARTHUR B. KELLER

BY McLean, Morton & Boustead
ATTORNEYS

United States Patent Office 3,534,631
Patented Oct. 20, 1970

3,534,631
INFINITELY VARIABLE RATIO CONSTANT MESH GEARING SYSTEM
Arthur B. Keller, P.O. Box 948,
Anchorage, Alaska 99501
Filed Aug. 16, 1968, Ser. No. 753,131
Int. Cl. F16h 47/04
U.S. Cl. 74—687                                   2 Claims

ABSTRACT OF THE DISCLOSURE

A variable speed constant mesh gearing system that has an infinitely variable output is disclosed. The system includes planetary gearing wherein ratio of input to output is controlled by a hydraulic system governing the speed of the sun gear connected to the input and output.

---

The present invention relates to a system by which an infinite ratio of input to output speeds may be obtained in a planetary gearing system.

BACKGROUND

Numerous methods of transmitting energy from motors or engines are in use. Commonly employed forms, such as those utilized in automobiles, do not allow more than a limited number of drive ratios, e.g. three or four, to be selected.

The larger truck transmissions use as many as sixteen different gear ratios which slow acceleration since a substantial period is consumed in shifting through the gears. Planetary gearing systems are used in automobile gear shifts. Two sets of planetary gears are coupled and speed ratios are varied by locking different sets of the gears.

The present invention, however, allows the gradual shift through of an infinite number of drive ratios since the planetary system employed allows continuous changes in the speeds of both the input and control gears. This means that the engine is continuously applying torque to the output, greatly increasing its efficiency.

The use of a planetary gear system to allow infinite variation in drive ratios has been suggested previously when used in conjunction with a worm gear on, for example, the ring gear. Generally, such worm gear type systems are useful only where the load is high and fairly constant and the speed does not appreciably change such as synchronizing processing machinery or where the torque is very low and large speed differences occur such as in mechanical computers.

These systems are different from the present invention, in that the present invention utilizes a hydraulic system to control the movement of the sun gear, and does not employ a worm gear in the planetary system. The present invention represents an improvement over such systems in that this may be utilized in high torque, large speed difference systems, e.g. trucks, since the control system for the sun gear which varies the drive ratio can be operated under torques and speeds that vary under a wide range of conditions.

DESCRIPTION OF INVENTION

The present invention uses a hydraulic system to vary the speed of the sun gear in a planetary gear drive system. The planetary gears are utilized for the input and the output is taken off of the exterior ring gear. If desired, it is possible to reverse this and have the ring gear be the input and the planetary gears be the output.

The sun gear is controlled by a spur gear that drives a positive displacement pump in one hydraulic system. The fluid is pumped radially into one gear of a second hydraulic pump controlled by a second hydraulic system.

The second system utilizes the rotation of the input shaft to drive a third pump, which drives a motor mechanically connected to one of the second pump gears in the first system.

The control of the speed is effected by an adjustable valve that varies the fluid flow through the motor by varying the amount of fluid by-passed. The varying fluid flow in the motor varies the speed in the radially fed pump and thus the flow rate through the entire first hydraulic system and therefore the speed of the positive displacement pump, which controls the speed of sun gear.

DESCRIPTION OF DRAWINGS

In FIG. 1 input shaft 10 is shown with speed control take off gear 11 connected to it. Motion is transferred by input shaft 10 rotating, and thus turning planetary gear plate 13 which moves planetary gears 12. The planetary gears 12 revolve around sun gear 36, and, depending upon the sun gears speed, turns ring gear 14 at a controlled rate. Ring gear 14 is connected to output shaft 15.

Figure 1:
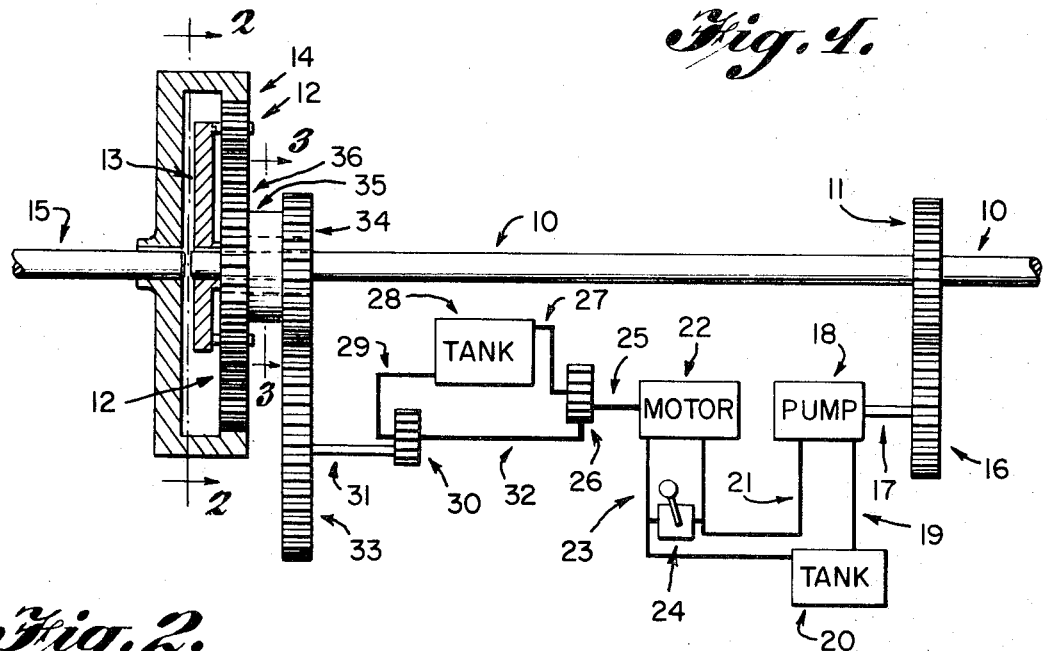
FIG. 1 is a schematic drawing of the preferred embodiment of the invention showing the planetary gear system in section.

The speed of the output shaft 15 depends on both the planetary gears 12, or input shaft 10, and the sun 36. Output speed is thus controlled by varying the speed of the sun gear.

To effect this, speed control take off gear 11 is connected to input shaft 10, and rotates pump drive gear 16 which drives positive displacement pump 18 through shaft 17. Pump 18 is supplied with fluid from tank 20 by hydraulic line 19, and supplies pressurized fluid through line 21 to drive motor 22 at a speed proportionate to that of the input shaft. The outlet fluid of motor 22 is returned to tank 20 by line 23.

Bypass valve 24 is used to control the flow of fluid through motor 22 and thus the speed of output shaft 25. Motor output shaft 25 is connected to either one of pump gears 26 and therefore controls the flow of fluid through line 32.

Hydraulic line 29 supplies fluid from tank 28 to pump gears 30 which is connected by shaft 31 to gear 33. Gear 33 is meshed with gear 34 which is connected to sun gear 36 by hollow shaft 35.

Figure 2:
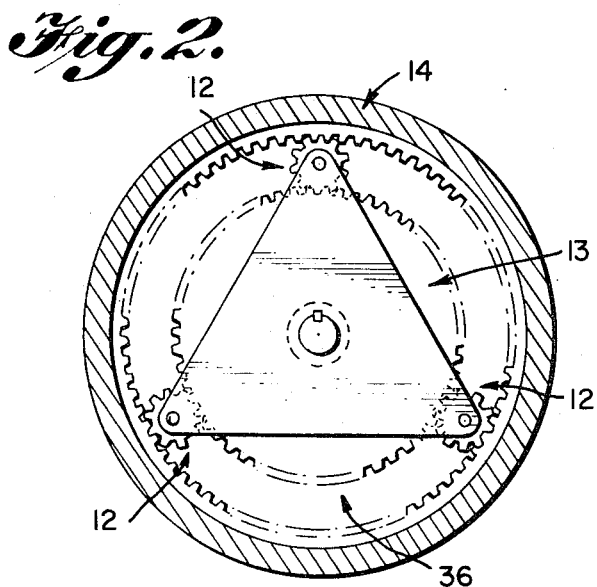
FIG. 2 is detail taken along line 2—2 of FIG. 1 showing the placement of the gears within the planetary gear system.

In FIG. 2, the basic planetary gear system is shown. Planetary gears 12 are driven by input shaft 10, not visible, through plate 13, and revolve around sun gear 36 to drive ring gear 14.

Figure 3:
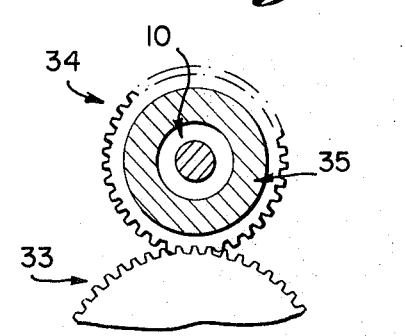
FIG. 3 is a detail taken along lines 3—3 of FIG. 1 and showing the positioning of the sun gear control gears around the input shaft.

FIG. 3 illustrates gear 34, and control gear 33. Gear 34 is connected to the sun gear, not shown, and input shaft 10 turns independently within the cylindrical hollow section of gear 34 and shaft 35.

Figure 4:
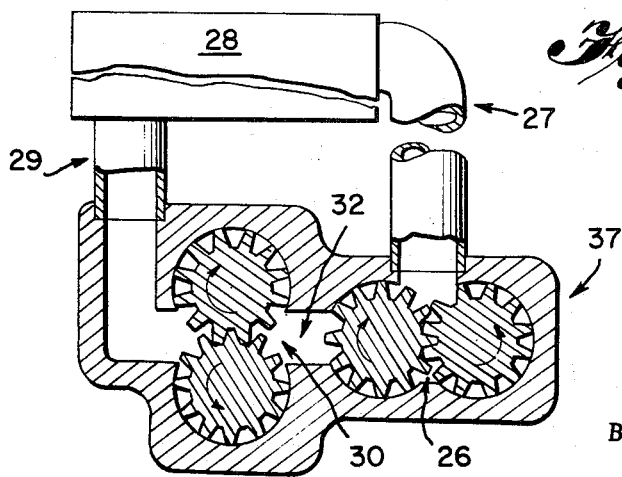
FIG. 4 is a detail of the preferred form of the hydraulic control system, showing the positive displacement pump in section.

In FIG. 4, the preferred embodiment of positive displacement pump 37 is shown. Fluid flows from tank 28 through line 29 and passes around gears 30 which are turned through the gear arrangement shown in FIG. 1. The fluid then flows through line 32 and impinges radially on gear 26 which is turned by shaft 25 (not shown). The fluid passing around gear 26 is returned to tank 28 by line 27.

In the operation of the gearing system of the present invention input shaft 10 rotates thus revolving planetary gears 12 around sun gear 36 and turning ring gear 14 which turns the drive shaft 15. The speed of output shaft 15 is controlled by varying the speed of sun gear 36 which is, in turn, controlled by the hydraulic gear system.

When the system is "idling" and the output is stationary sun gear 36 rotates twice as fast as the planetary gears which are driving it. When the power of input shaft 10 is to be utilized, sun gear 36 is slowed by the aforementioned hydraulic system thus causing ring gear 14 to rotate. The speed of the ring gear 14 is determined by the relative speeds of the other gears by well known relationships.

The illustrated hydraulic control will allow the controllable gear to rotate at a given proportionate ratio of the input shaft, the speed of the input shaft automatically controlling the speed of the sun gear without varying the setting of valve 24.

The above description is of the preferred embodiments of the present invention, and it is not to be construed as limiting the intent of the invention. Obvious changes and modifications may be made without being outside the intended scope.

It is claimed:

1. In an infinitely variable ratio transmission having an input shaft, an output shaft, a planetary gearing system comprising a sun gear, a planetary gear, and a ring gear, said input shaft attached to one of said gears and said output attached to a second of said gears and means to controllably vary the speed of the third of said gears, the improvement comprising a hydraulic pump run by said input shaft, said hydraulic pump powering a hydraulic motor rotating at a speed proportionate to said input shaft, a bypass valve around said motor for varying its proportionate speed, said third controllable gear connected with a hydraulic system by a positive displacement hydraulic pump, the output of which is connected radially of one of the gears to a second hydraulic pump, the gears of which are mechanically connected to said hydraulic motor, whereby said third controllable gear rotates at a variable constantly proportionate speed of said input shaft thereby causing said output shaft to rotate at a variable ratio.

2. A variable speed constant mesh gearing system comprising a planetary gear drive means and a hydraulic means to vary the speed of the sun gear in said planetary drive means, said sun gear being connected to a positive displacement pump, the flow through said positive displacement pump being controlled by a radially fed pump which is turned by a variable speed motor, said variable speed motor driven by fluid being circulated by a pump driven by the input shaft and the speed of said motor controlled by a by-pass valve that may be varied in opening.

References Cited
UNITED STATES PATENTS

| | | | |
|---|---|---|---|
| 3,345,885 | 10/1967 | Tschanz | 74—687 |
| 3,132,533 | 5/1964 | Baker | 74—687 |
| 2,995,049 | 8/1961 | Bolliger | 74—687 |

FOREIGN PATENTS

| | | |
|---|---|---|
| 450,488 | 7/1936 | Great Britain. |

DONLEY J. STOCKING, Primary Examiner

T. C. PERRY, Assistant Examiner